US011249738B2

(12) United States Patent
Rabaute et al.

(10) Patent No.: US 11,249,738 B2
(45) Date of Patent: Feb. 15, 2022

(54) ON-BOARD COMPUTING SYSTEM FOR AN AIRCRAFT

(71) Applicants: Airbus Operations SAS, Toulouse (FR); Airbus Operations GmbH, Hamburg (DE)

(72) Inventors: Eric Rabaute, Toulouse (FR); Frank Schaller, Hamburg (DE); Stéphane Poulain, Hamburg (DE); Daniel Kliem, Hamburg (DE); René Niedermowe, Hamburg (DE); Torben Krumm, Hamburg (DE)

(73) Assignees: AIRBUS OPERATIONS SAS, Toulouse (FR); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/902,985

(22) Filed: Jun. 16, 2020

(65) Prior Publication Data

US 2021/0149654 A1 May 20, 2021

(30) Foreign Application Priority Data

Jun. 14, 2019 (EP) .................................... 19290037

(51) Int. Cl.
*H04L 29/08* (2006.01)
*H04L 29/06* (2006.01)
(Continued)

(52) U.S. Cl.
CPC ............ *G06F 8/60* (2013.01); *G06F 9/44505* (2013.01); *G06F 9/544* (2013.01); *G06F 11/302* (2013.01);
(Continued)

(58) Field of Classification Search
CPC ........ B64C 2201/141; B64C 2201/127; B64C 39/024; B64C 13/341; B64C 13/505;
(Continued)

(56) References Cited

U.S. PATENT DOCUMENTS 5,546,590 A * 8/1996 Pierce ................... G06F 1/3203
713/321
8,806,579 B1 8/2014 Angus et al.
(Continued)

FOREIGN PATENT DOCUMENTS

EP 2551771 A1 1/2013

OTHER PUBLICATIONS

Shen et al., Partitioning strategy based on safety in integrated modular avionics, 6 pages (Year: 2016).*
European Search Report; priority document.

*Primary Examiner* — Thuy Dao
(74) *Attorney, Agent, or Firm* — Greer, Burns & Crain, Ltd.

(57) ABSTRACT

An on-board computing system for an aircraft. The computing system comprises a plurality of partitions each including at least one software component configured to perform a function related to the aircraft, wherein software components of different partitions of the plurality of partitions are configured to exchange data via a communication hub of the computing system, the communication hub being configured to store data items exported by exporting software components of the plurality of partitions and to provide the stored data items to reading software components of the plurality of partitions.

16 Claims, 7 Drawing Sheets

(51) Int. Cl.
*G06F 9/46* (2006.01)
*G06F 9/50* (2006.01)
*G06F 9/48* (2006.01)
*G08G 5/00* (2006.01)
*G06F 8/60* (2018.01)
*G06F 16/901* (2019.01)
*G06F 9/445* (2018.01)
*G06F 9/54* (2006.01)
*G06F 11/30* (2006.01)
*G06F 21/62* (2013.01)

(52) U.S. Cl.
CPC ...... *G06F 16/9027* (2019.01); *G06F 21/6218* (2013.01); *G06F 2201/84* (2013.01); *G06F 2221/2141* (2013.01)

(58) Field of Classification Search
CPC ..... B64C 13/22; B64C 13/343; B64C 13/506; G02B 19/0014; G02B 19/0052; G02B 19/0085; G02B 19/009; H04L 67/12; H04L 67/34; H04L 41/0856; H04L 41/12; H04L 41/0803; H04L 41/0853; H04L 12/4641; G06F 9/60; G06F 16/8027; G06F 9/44505; G06F 9/544; G06F 2201/84; G06F 2201/2141; G06F 8/60; G06F 16/9027; G06F 9/5077; G06F 9/4887; H04B 7/18506
See application file for complete search history.

(56) References Cited

U.S. PATENT DOCUMENTS

| | | | |
|---|---|---|---|
| 9,672,100 B2* | 6/2017 | Gauthier | G06F 11/1044 |
| 2002/0144010 A1 | 10/2002 | Younis et al. | |
| 2003/0074495 A1* | 4/2003 | Lee | G06F 13/28 |
| | | | 710/10 |
| 2004/0034554 A1* | 2/2004 | Shirley | G06Q 10/06311 |
| | | | 705/7.13 |
| 2004/0041029 A1* | 3/2004 | Postman | G06F 1/1632 |
| | | | 235/462.3 |
| 2004/0186971 A1* | 9/2004 | Meharchand | G06F 12/145 |
| | | | 711/163 |
| 2009/0207521 A1* | 8/2009 | Gosalia | G06F 9/5011 |
| | | | 360/77.02 |
| 2010/0023545 A1* | 1/2010 | Gladkov | G06F 11/323 |
| | | | 707/E17.005 |
| 2014/0206303 A1* | 7/2014 | Ziarno | H04B 1/3822 |
| | | | 455/90.1 |
| 2015/0148998 A1* | 5/2015 | Mere | G08G 5/06 |
| | | | 701/3 |
| 2016/0055752 A1* | 2/2016 | McCann | G08G 5/0021 |
| | | | 701/533 |
| 2020/0334994 A1* | 10/2020 | Jensen | G08G 5/0004 |

\* cited by examiner

```
Aircraft
  isOnGround: Bool          // topic
  Cabin                     // topic
    Temp: Integer           // topic
    Zone 1
      Brightness: Integer   // topic
    Zone 2
      Brightness: Integer
```

ON-BOARD COMPUTING SYSTEM FOR AN AIRCRAFT

CROSS-REFERENCES TO RELATED APPLICATIONS

This application claims the benefit of the European patent application No. 19290037.1 filed on Jun. 14, 2019, the entire disclosures of which are incorporated herein by way of reference.

FIELD OF THE INVENTION

The present disclosure generally relates to computing systems. More particularly, the present disclosure relates to an on-board computing system for an aircraft which comprises a plurality of partitions each including at least one software component configured to perform a function related to the aircraft.

BACKGROUND OF THE INVENTION

In the aircraft industry, there is a general trend that airborne computing systems, including embedded real-time computing systems, such as safety relevant avionic systems and aircraft cabin management systems in general, exhibit steadily growing complexity. As proof of correctness needs to be provided to authorities during the certification of software, safety relevant computing systems are typically created according to an interface-centric approach in which the software components have well-defined interfaces and communicate with each other using their interfaces. With potentially hundreds of software components, however, this approach may lead to dependencies among the components that make the overall software inflexible to maintain and extend.

For safety reasons, critical software components are usually executed on different partitions, i.e., in segregated execution environments, to avoid affecting the operability of one component by the failure of another component. It is desired in this regard that safety and data certification of the systems required by authorities can be done at the level of the partitions so that, if one of the partitions is changed, the effect of this change on other partitions can clearly be identified. Also, as the system software development process and the verification and certification activities account for a significant part of the overall development effort, it is generally desired to reduce certification complexity. To reduce re-certification efforts due to a change, partitions may be excluded from the re-certification process if (and only if) it can be demonstrated that they are unaffected by the change. However, the more coupling and dependencies exist between the partitions, e.g., in form of data flows between the software components executed thereon, the more difficult it is to demonstrate the unaffectedness of one partition due to changes applied to others.

SUMMARY OF THE INVENTION

It is thus an object of the present disclosure to provide an architectural approach that enables handling the growing complexity of airborne computing systems and allows creating large scale systems that remain maintainable and extensible.

According to a first aspect of the present disclosure, an on-board computing system for an aircraft is provided. The computing system comprises a plurality of partitions each including at least one software component configured to perform a function related to the aircraft, wherein software components of different partitions of the plurality of partitions are configured to exchange data via a communication hub of the computing system, the communication hub being configured to store data items exported by exporting software components of the plurality of partitions and to provide the stored data items to reading software components of the plurality of partitions.

The communication hub may thus function as a communication means (or "service") between the software components of the plurality of partitions and may as such reduce the coupling between the partitions since each partition, including the software components executed thereon, may only interface with the communication hub but may not support direct interfaces to software components residing on other partitions of the computing system. Rather, software components being executed in different partitions may communicate (e.g., exclusively) through the communication hub to exchange data items, such as to exchange their functional states, for example.

From an architectural point of view, instead of using an interface-centric approach, the computing system of the present disclosure may thus be based on a data-centric approach, e.g., an approach which makes use of the concepts of data fusion (relating to the integration of multiple data sources to produce more consistent, accurate and and/or useful information than that provided by any individual data source) and/or data concentration (relating to the use of a central software component receiving a set of data items from different sources and making them available to identified customers with or without restriction). The communication hub may in other words make data exported by the exporting software components observable (or "readable") by the reading software components of the plurality of partitions.

Exporting software components may correspond to those software components among the software components of the plurality of partitions which export (or "write") data to the communication hub so that other software components of the plurality of partitions, i.e., the reading software components, may read (or generally "access") the data via the communication hub. The software components of the plurality partitions, no matter whether exporting or reading software components, may comprise at least one of real-time and non-real-time software components that perform real-time or non-real-time functions related to the aircraft, respectively. Functions related to the aircraft may comprise common functions of an avionic system, for example, and the computing system may generally be an embedded (e.g., real-time) computing system. As an example, the computing system may be a cabin management system and the software components of the plurality of partitions may comprise at least one of a lighting control component for controlling cabin lighting and a smoke detection component for detecting smoke in the cabin. Each software component may be executed on a corresponding partition of the plurality of partitions, wherein each partition may be a segregated (or "independent") execution environment for executing the respective software components.

The communication hub may be implemented as a software service that is executed on the computing system and, as such, the communication hub may be a software component of the computing system as well. While, in one variant, the communication hub may be implemented as a monolithic software component, in other variants, the communication hub may be implemented using (e.g., distributed)

subcomponents, wherein a central hub component stores the exported data items and wherein each partition comprises a local hub component functioning as a local communication means (or "service") to the software components within the respective partition. Each local hub component may provide an interface (e.g., an application programming interface (API)) to the software components of the respective partition to provide access (e.g., read and/or write access) to the storage of the communication hub. The communication hub may thus comprise a central hub component storing the data items and local hub components in each of the plurality of partitions each providing an interface usable by the at least one software component of the respective partition to access the data items stored by the central hub component.

The data items exported by the exporting software components may correspond to functional (or "internal") states of the exporting software components which may need to be shared with other software components of the computing system. As an example, the lighting control component may need to read functional states of the smoke detection component, such as the current smoke detection state. The smoke detection component may thus export the current smoke detection state to the communication hub and the lighting control component may read the current smoke detection state from the communication hub to control parameters regarding the cabin lighting, including the current lighting brightness, for example. Among the data items exported by the exporting software components, each data item may be exportable by exactly one exporting software component of the plurality of partitions, e.g., to make sure that each data item exported to the storage of the communication hub may only be written by a particular software component, thereby preventing that a functional state exported by that software component is overwritten by another software component. Read access to exported data items may be unlimited, on the other hand, so that each data item stored by the communication hub may be readable by any reading software component of the plurality of partitions. It will be understood that read access to exported data items may also be limited (e.g., for data security reasons) to software components having explicit reading rights, so that each data item stored by the communication hub may be readable by reading software components of the plurality of partitions which have explicit reading rights for the respective data item.

In one implementation, the data stored by the communication hub may be organized in a tree data structure, wherein the data items may represent leaf elements in the tree, for example. The data items may thus be stored in a tree structure and the software components of the plurality of partitions may use paths for traversing the tree structure to access the data items stored by the communication hub. The paths may be defined at design time (i.e., before runtime) and the software components may be configured with the paths necessary to export/write and read their data items of interest. The path configurations may be provided in the form of individual partition configurations defining the data items to be exported and/or read by the respective software component, for example, and the tree structure for storing the data items may be built based on the individual partition configurations at runtime. The communication hub may thus be configured to read, when the computing system is initialized, individual partition configurations from the plurality of partitions defining data items to be accessed by the at least one software component of the respective partition, wherein the communication hub is configured to construct the tree structure based on the individual partition configurations.

The communication hub itself may not be dependent on a certain tree structure but may construct the tree dynamically based on the individual partition configurations laid down at design time. As such, it may be said that the communication hub does not "know" the data items and their values but only knows how to handle and store the data items. From the viewpoint of the communication hub, the data items may be said to represent opaque data items (e.g., with a well-known size) while the actual content of the data items may be irrelevant to the communication hub.

To enforce that each data item is exportable by exactly one exporting software component, as described above, the communication hub may be configured to detect misconfigurations in the individual partition configurations when multiple exporting software components of the plurality of partitions are defined to export a same data item, i.e., in other words, when multiple software components claim to be the writer for the same data item (e.g., due to a misconfiguration at design time). A software component with the higher criticality may in this case be granted the provider rights, i.e., the communication hub may be configured to grant, when a misconfiguration is detected, exporting rights to an exporting software component of the multiple exporting software components having the highest criticality. The criticality may relate to a (e.g., predefined) prioritization among the software components of the plurality of partitions according to their safety relevance. As an example, due to a generally higher safety relevance of smoke detection over cabin lighting, the smoke detection component may be assigned a higher criticality value than the lighting control component and, as such, the communication hub may prioritize the smoke detection component over the lighting control component when it comes to writing a conflicting data item to the storage of the communication hub, for example.

While it is generally conceivable that the computing system corresponds to a distributed computing system in which the central hub component and the local hub components may correspond to networked components, in one particular implementation, the computing system may correspond to a monolithic computing system. The computing system may in this case comprise at least one processor and at least one memory, wherein the plurality of partitions may represent logical partitions providing segregated execution environments on the monolithic system. In such an implementation, the communication hub may be configured to enforce the grant of exporting rights using a memory management unit (MMU) of the computing system, for example. In particular, the communication hub may be implemented using a shared memory, wherein the data items stored by the communication hub may be stored in the shared memory. For access optimization and efficient implementation of the communication hub, each of the local hub components may in this case maintain an index table mapping a path for traversing the tree structure to access the data items stored by the communication hub to a physical address of the shared memory. The index table may be created (or "built") when initializing the communication hub, so that information about the available data items are available in each partition and can be provided to the software components executed thereon. The MMU may manage the shared memory and may be used to translate access attempts (read and/or write attempts) to the communication hub to the corresponding physical addresses of the shared memory. This may result in fast and predictable access times that may not increase with a growing amount of data items, thereby enabling an implementation of a highly scalable system.

As the software components of different partitions may not interface directly with each other (the software components "do not know" each other), as described above, the software components may communicate indirectly via the communication hub, e.g., through the shared memory. The software components may thus interface with the communication hub and read or write data items of interest through the interface provided by the communication hub. As the communication hub may not know the data items and their values, as described above, a comparatively small (lightweight) API may be employed to provide access to the communication hub. An exemplary API provided by the communication hub may support a "Get" function, a "Put" function and, optionally, a "Subscribe" function. A "Get" function may be used by reading software components to read data items from the storage of the communication hub, a "Put" function may be used by exporting software components to export/write data items to the storage of the communication hub, and a "Subscribe" function may be used to subscribe for updates regarding changed values of data items of interest. In each of these functions, access to particular data items may be identified by paths for traversing the tree structure (i.e., the paths representing parameters to the functions), for example. As compared to an interface-centric approach, reduced API footprints may thereby be achieved and all data items may be accessed by a single harmonized API.

In case the value of a data item stored by the communication hub is updated by an exporting software component, the value of the data item may be overwritten, so that the data item always reflects the last updated value (corresponding to a "sampling characteristic"). In other variants, the communication hub may be configured to store a value history of the data item when updates are received (corresponding to a "queuing characteristic", e.g., following a first-in-first-out scheme). To this end, each of the local hub components may maintain a value history of the data items stored by the communication hub. In order to support the use of lightweight APIs and optimized storage of the data items in the storage of the communication hub, each data item stored by the communication hub may have at least one of a size attribute and an age attribute. An age attribute may be used to detect a most recent write access done to the communication hub, for example.

The communication hub—as a separate software service component enabling communication between the software components of the plurality of partitions—may need to be operable prior to the software components of the plurality of partitions are started. Thus, when the computing system is initialized, initialization of the communication hub may (need to) be completed before the software components of the plurality of partitions are started. To initialize the storage of the communication hub, the communication hub may be configured to fill, when the computing system is initialized (e.g., after reading the individual partition configurations and constructing the tree structure), data items to be accessed with default values, or with "no data" indications if no default values are available.

The communication system may further comprise a monitoring component configured to export snapshots of the data items stored by the communication hub. In this way, data held by the communication hub may be used to support engineering and/or maintenance activities, such as carrying out a system restoration, for example. The monitoring component may be implemented on a separate partition with full reading rights to the whole storage of the communication hub, such as the entire tree structure stored in the shared memory, for example.

According to a second aspect of the present disclosure, an aircraft comprising a computing system according the first aspect is provided.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from the specific details.

Figure 1:
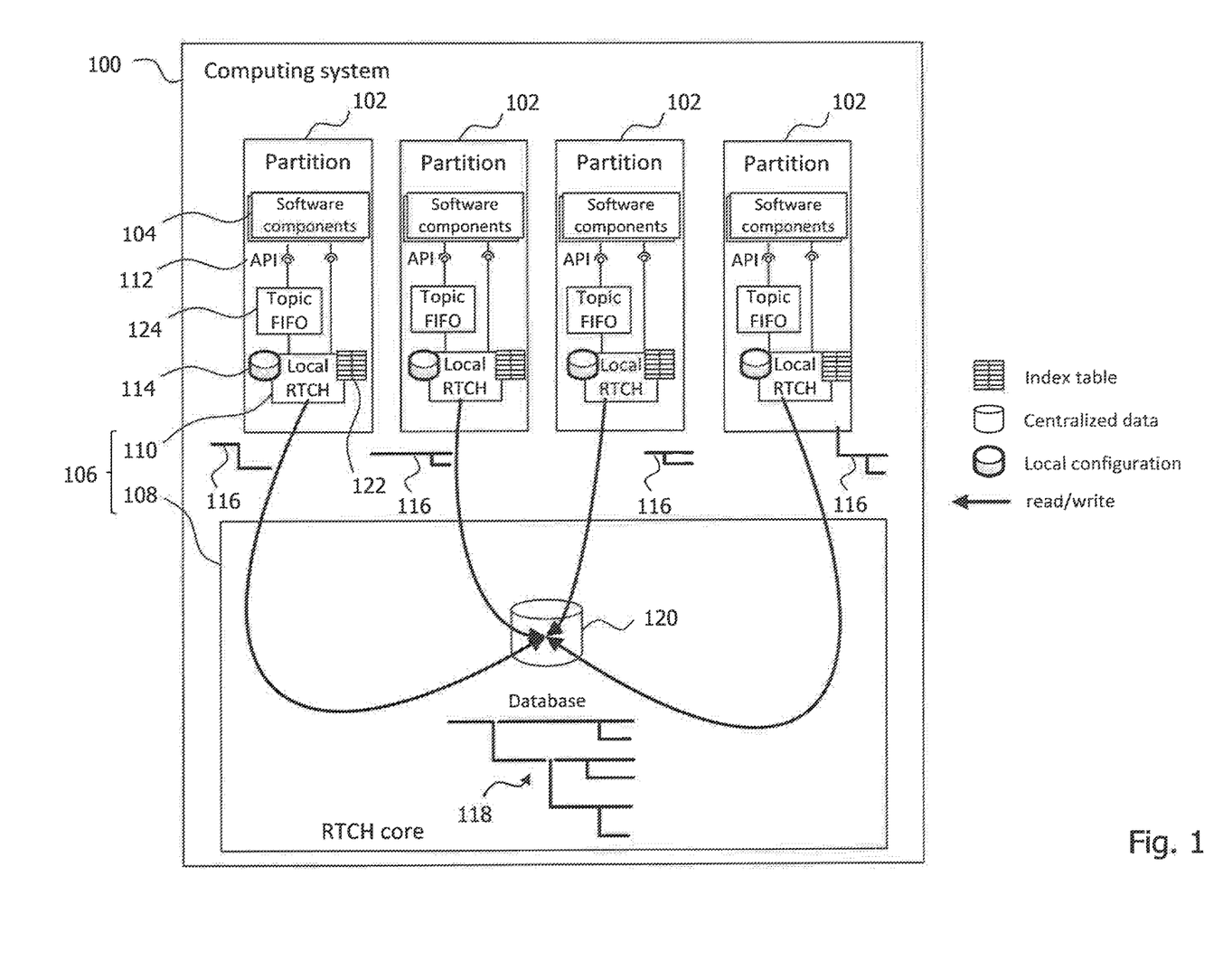
FIG. 1 schematically illustrates an exemplary on-board computing system for an aircraft according to the present disclosure.

FIG. 1 schematically illustrates an exemplary on-board computing system 100 for an aircraft according to the present disclosure. The computing system 100 comprises a plurality of partitions 102 each including at least one software component 104 configured to perform a function related to the aircraft. The software components 104 of the various partitions 102 (only the leftmost partition is supplied with reference numerals in the figure for the sake of clarity of illustration) may comprise real-time and non-real-time software components that perform real-time or non-real-time functions related to the aircraft, respectively. Functions related to the aircraft may comprise common functions of an avionic system, for example.

The computing system 100 further comprises a communication hub 106 configured to store data items exported by exporting software components among the software components 104 and to provide the stored data items to reading software components among the software components 104. In the shown example, the communication hub 106 is implemented using several subcomponents and, more specifically, comprises a central hub component 108 (denoted as real-time communication hub core, "RTCH core", in the figure) which is responsible for storing data items exported by exporting software components 104 as well as local hub components 110 (denoted as "local RTCH" in the figure) in each of the plurality of partitions 102, wherein each of the local hub components 110 provides an interface 112 in the form of an API usable by the software components 104 of the respective partition 102 to access the data items stored by the central hub component 108.

Figure 2A:
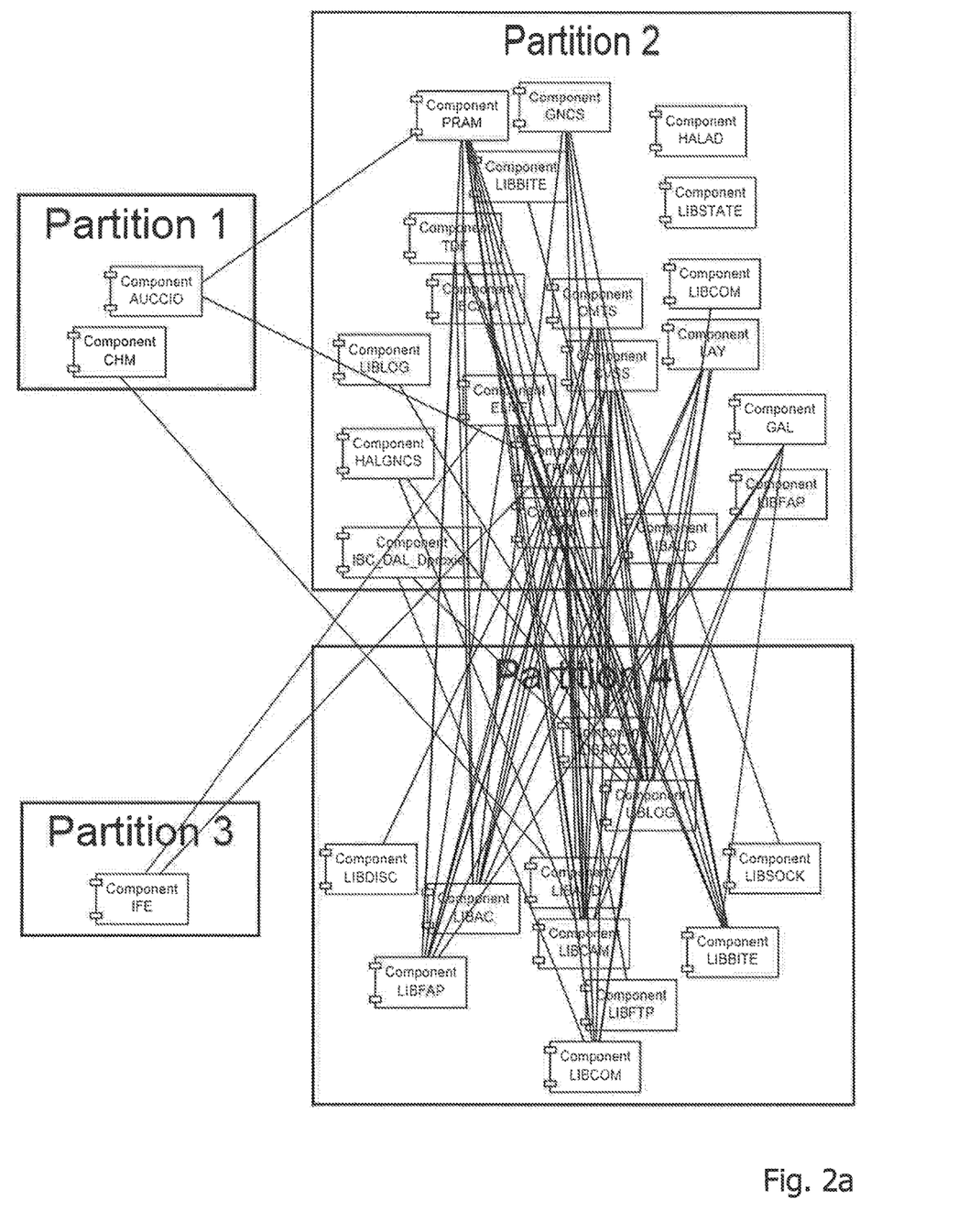
FIGS. 2a and 2b provide an illustration for the reduced coupling achievable between partitions and their software components by the use of a communication hub as an intermediary communication means according to the present disclosure.
Figure 2B:
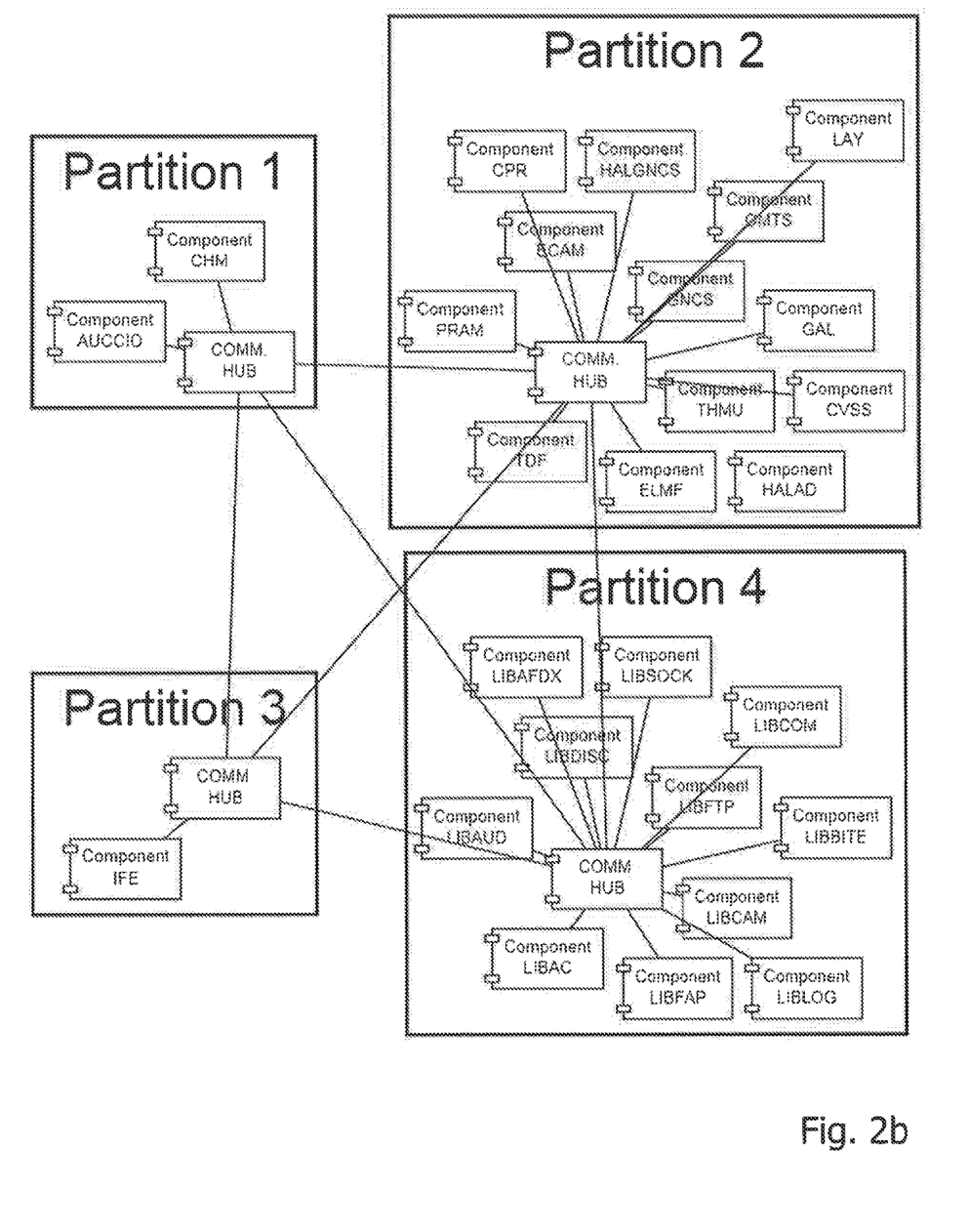

In the computing system 100, software components 104 residing on different partitions 102 are generally configured to exchange data via the communication hub 106. The communication hub 106 may thus function as a communication means (or "service") between the software components 104 and may as such reduce the coupling between the partitions 102. The effect of reduced coupling between the partitions 102 and their software components 104 by the use of the communication hub 106 as an intermediary communication means is exemplarily illustrated in FIGS. 2a and 2b which show an exemplary setup of four partitions. FIG. 2a illustrates the case of a typical interface-centric approach in which the software components support direct interfaces among each other and perform their communication using these interfaces. As may be seen in FIG. 2a, extensive coupling and dependencies exist between the partitions and their software components when using the interface-centric approach. FIG. 2b, on the other hand, illustrates the case in which local hub components are provided in each partition (just as in the example of FIG. 1), wherein the software components of a partition only interface with the local hub component of that partition and thus communicate via the respective local hub component with other software components, generally following a data-centric approach. It immediately gets apparent from FIG. 2b that the coupling and dependencies between the partitions and their software components are drastically reduced in comparison to FIG. 2a by shifting the architecture to the data-centric approach.

The computing system 100 may be an embedded (e.g., real-time) computing system. As an example, the computing system 100 may be a cabin management system and the software components 104 may comprise at least one of a lighting control component for controlling cabin lighting and a smoke detection component for detecting smoke in the cabin. The data items exported by the exporting software components 104 may correspond to functional states of the exporting software components 104 which may need to be shared with other software components 104 of the computing system 100. As an example, the lighting control component may need to read functional states of the smoke detection component, such as the current smoke detection state. The smoke detection component may thus export the current smoke detection state to the communication hub 106 and the lighting control component may read the current smoke detection state from the communication hub 106 to control parameters regarding the cabin lighting, including the current lighting brightness, for example.

In the exemplary implementation of FIG. 1, the data stored by the communication hub 106 is organized in a tree-like data structure and the software components 104 may use paths for traversing the tree structure to access the data items. The paths in the tree may be defined at design time and the software components 104 may be configured with the paths necessary to export/write and read their data items of interest. The path configurations may be provided as part of individual partition configurations 114 available at the partitions 102 (e.g., held by the respective local hub components 110) and may define the data items to be exported and/or read by the respective software component 104. The tree structure for storing the data items may then be constructed based on the individual partition configurations 114 at runtime. In FIG. 1, the particular path portions based on which the tree structure is constructed are denoted by reference numeral 116 and the whole tree structure resulting from the construction operation is denoted by reference numeral 118. Once constructed, the tree structure is stored in the storage 120 of the central hub component 108 which, in the example of FIG. 1, is merely functionally indicated as a database.

Figure 3:
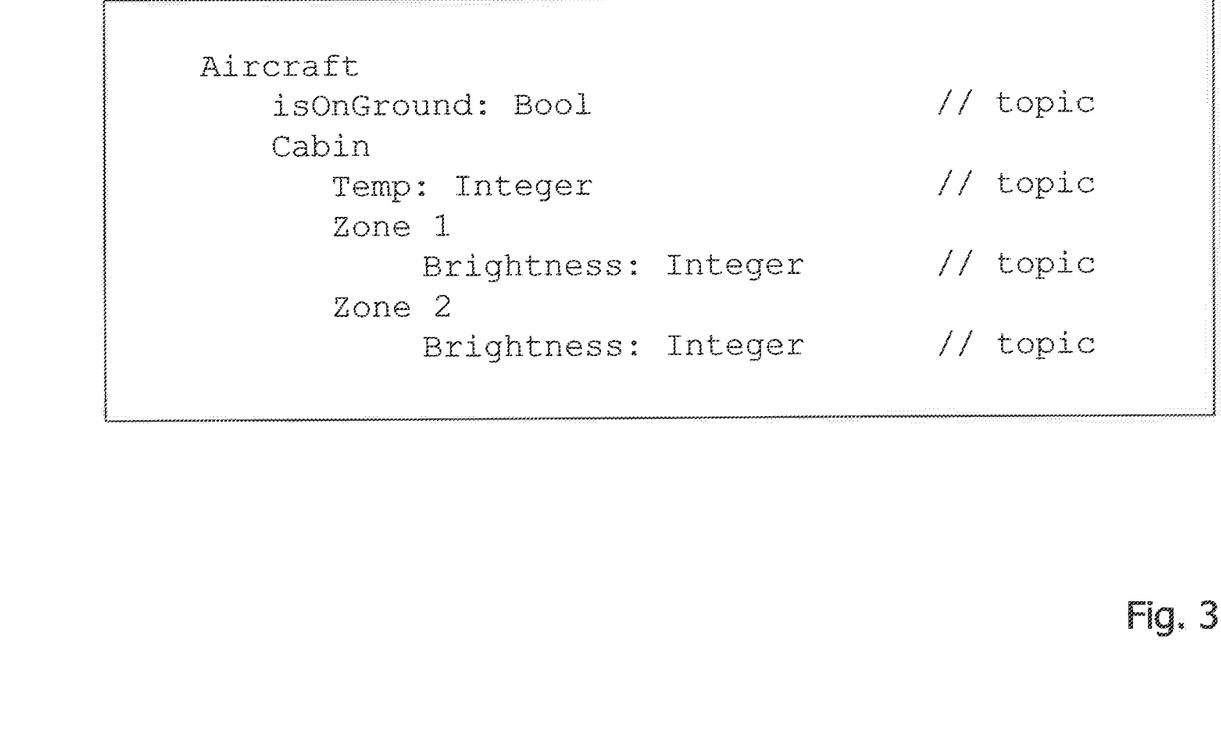
FIG. 3 illustrates an exemplary tree structure stored by the communication hub according to the present disclosure.

FIG. 3 illustrates an exemplary tree structure that is constructed from path configurations defined in the individual partition configurations 114. In the exemplary tree structure, the stored data items are the leaf elements of the tree and are generally denoted as "topics". As shown, the stored data items exemplarily include a Boolean value for the aircraft related topic "isOnGround", an integer value for the cabin temperature related topic "Temp", and integer values for the lighting related topics "Brightness" of zones 1 and 2 of the cabin.

As shown in FIG. 1, each local hub component 110 maintains an index table 122 mapping paths for traversing the tree structure to access the data items stored by the central hub component 108 to corresponding storage locations in the storage 120. The index table 122 may be created when the communication hub 106 is initialized, so that information about the available data items are available in each partition 102 and can be provided to the respective software components 104 (e.g., upon request over the API 112). To implement a "queuing characteristic" for the stored data items, each local hub component 110 is accompanied by a first-in-first-out "FIFO" memory 124 (denoted as "Topic FIFO") to maintain a value history of the data items stored by the central hub component 108. The software components 104 may generally access the services provided by the communication hub 106 (including the services of the Topic FIFO) via the API 112. The API 112 may correspond to a harmonized and lightweight API supporting a "Get" function, a "Put" function and, optionally, a "Subscribe" function which may take paths for traversing the tree to identify data items of interest as parameter, for example.

To ensure proper initialization of the computing system 100, a startup procedure of the computing system 100 may comprise the following steps. In a first step, the computing system 100 may be started and, subsequently, the central hub component 108 may read the individual partition configurations 114 from the respective partitions 102 in a second step. In a third step, the local hub components 110 may build the index tables 122 for each partition, so that each partition 102 and each software component 104 within the partitions may know the available topics. In a fourth step, the central hub component 108 may fill the topics with their default values, or with "no data" indications if no default values are available. Once initialization of the communication hub 106 is complete and the hub 106 is ready for operation, the partitions 102 and the software components 104 may be started in a fifth step. In a sixth step, after the startup of the partitions 102 and software components 104 is complete, the computing system 100 may be up and running.

Figure 4:
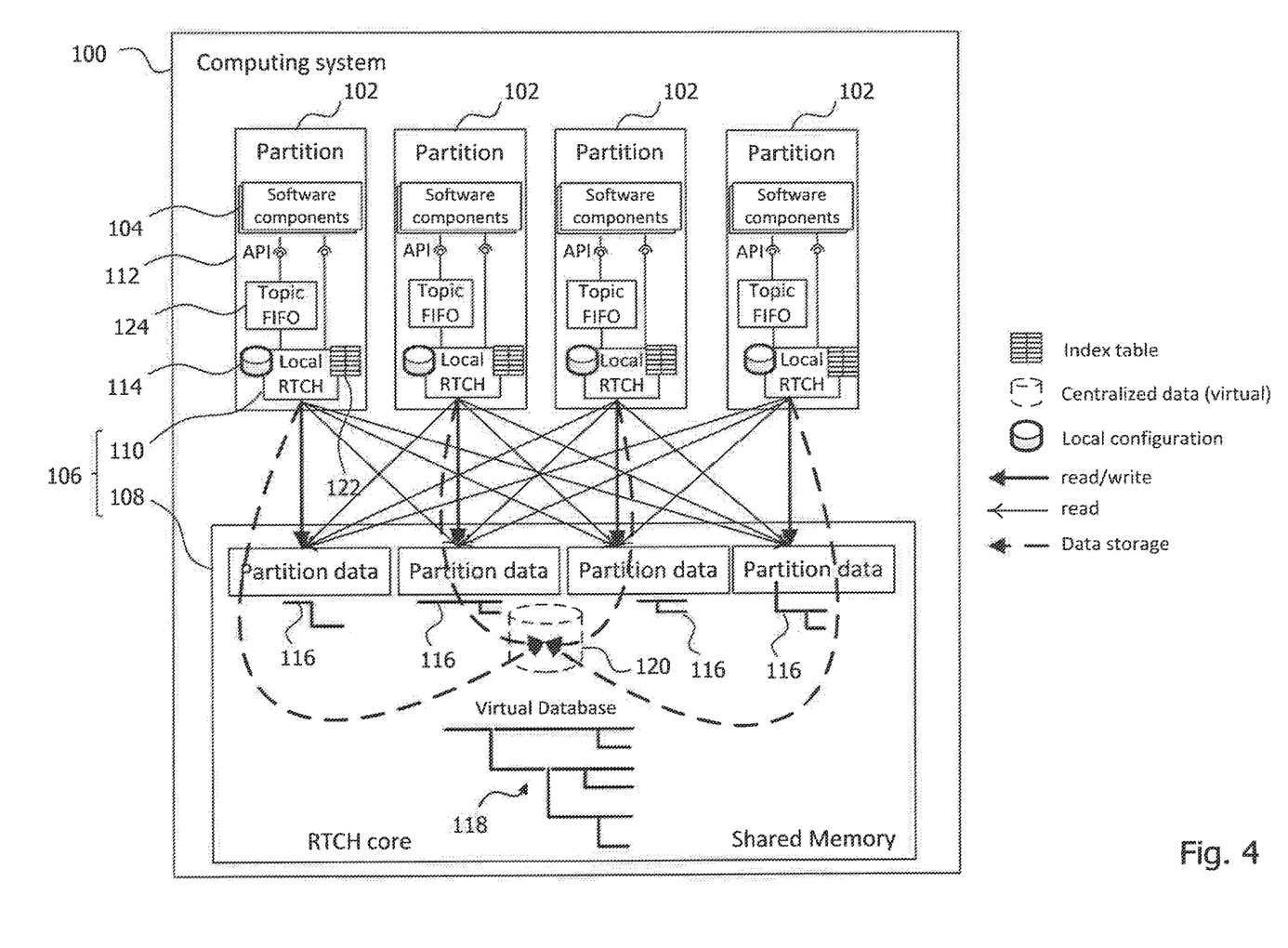
FIG. 4 schematically illustrates an implementation-related view of the computing system of FIG. 1, in which the storage of the communication hub is implemented using a shared memory.

While FIG. 1 generally shows a functional view of the central hub component 108 and its storage 120, FIG. 4 shows a more implementation-related view of the computing system 100, in which the storage 120 of the central hub component 108 is implemented using a shared memory. FIG. 4 as such differs from the example of FIG. 1 in that the view on the storage 120 of the central hub component 108 is only given by a virtual database, whereas the underlying data including the exported data items is in fact stored in a shared memory. As indicated in FIG. 4, the data items corresponding to the path portions based on which the tree structure is constructed may in this case be stored at particular physical addresses in the shared memory (denoted as "partition data" in the figure). The index table 122 of a respective partition 102 may then map paths for traversing the tree structure to physical addresses of the shared memory. A particularly efficient implementation with fast and predictable access times can be achieved when an MMU manages the shared memory and takes care of translating access attempts to the storage 120 into the physical addresses of the shared memory.

Figure 5:
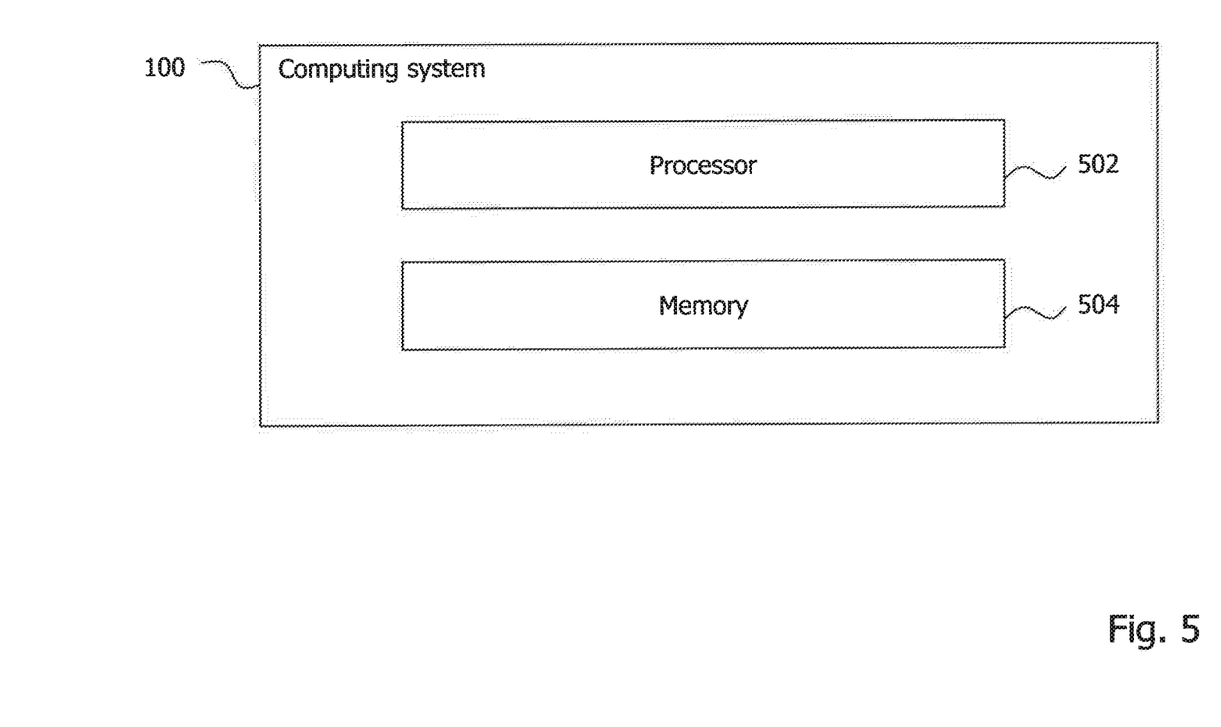
FIG. 5 illustrates an exemplary composition of the computing system when the computing system is a monolithic system.
Figure 6:
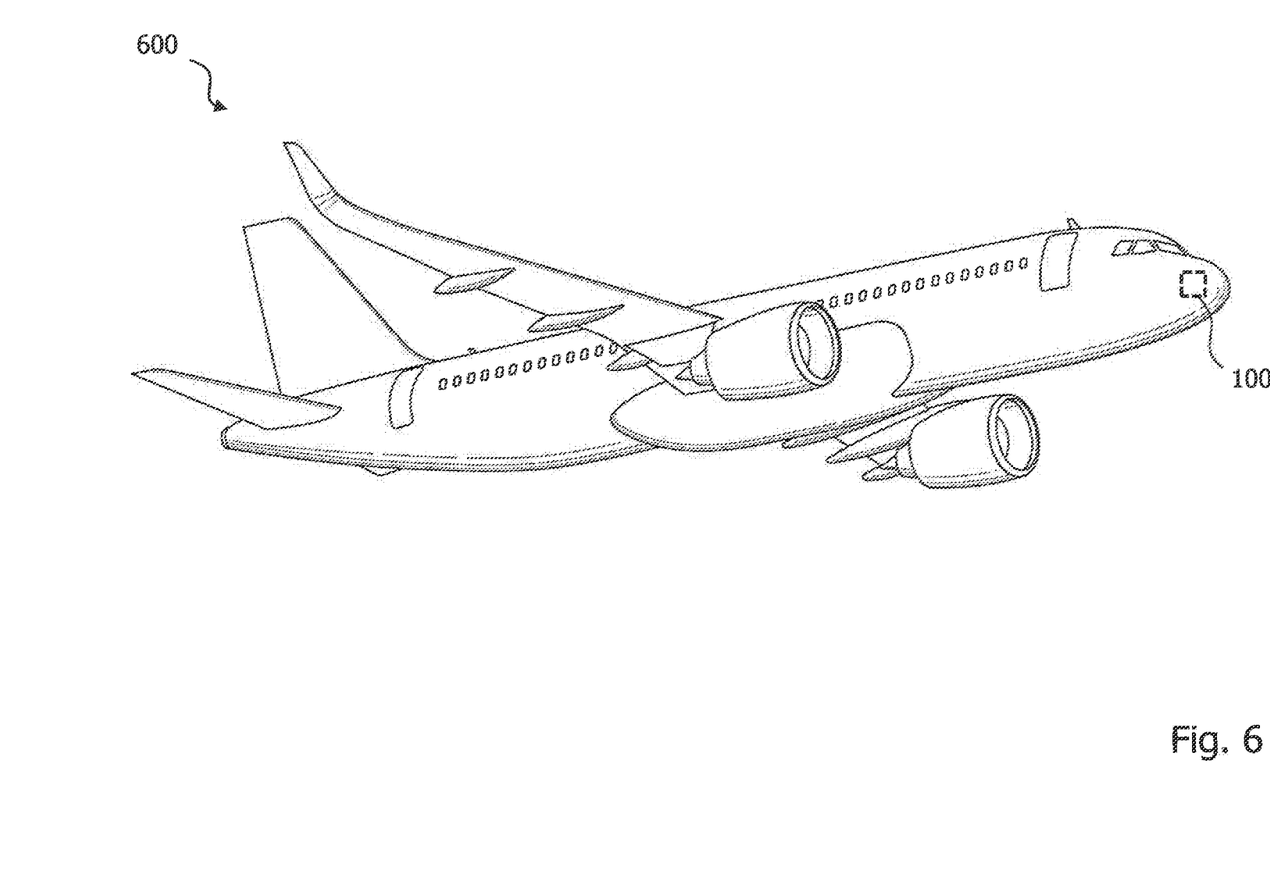
FIG. 6 illustrates an exemplary aircraft comprising the computing system according to the present disclosure.

In particular in the case of FIG. 4, the computing system 100 may correspond to a monolithic computing system comprising at least one processor and at least one memory, wherein the partitions 102 are implemented as logical partitions that provide segregated execution environments for execution of the various software components 104 on the monolithic system. For illustrative purposes, FIG. 5 shows an exemplary composition of such computing system 100 having at least one processor 502 and at least one memory 504 to carry out the tasks described herein with respect to the computing system 100. As shown in FIG. 6, the computing system 100 may be provided in an aircraft 600, such as in the avionics compartment at the nose of the aircraft 600, for example.

As has become apparent from the above, the present disclosure may provide an on-board computing system for an aircraft based on an architectural approach which generally shifts the interface-centric pattern to a more data-centric pattern, to thereby reduce the coupling and dependencies between software components executed in different partitions of the computing system. The approach may enable creating software components in a decoupled way to eliminate dependencies that would otherwise make the system inflexible to maintain and extend. Rather, the proposed approach may improve scalability and maintainability while keeping the necessary real-time guarantees at the same time. Also, the approach may support communication between safety-critical and non-safety-critical components while fully maintaining the safety features of the critical parts. The reduced coupling and dependencies may generally allow the handling of growing system complexity and may make it easier to demonstrate the unaffectedness of one partition when changes to other partitions are applied. In this way, certification may generally be performed at partition level and the certification effort as well as the overall system development complexity may be reduced. The communication hub may not introduce a bottleneck or single-point-of-failure to the software, especially when the computing system is implemented as a monolithic system using a shared memory.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An on-board computing system for an aircraft, the computing system comprising:
a plurality of partitions each including at least one software component configured to perform a function related to the aircraft,
wherein software components of different partitions of the plurality of partitions are configured to exchange data via a communication hub of the computing system, the communication hub being configured to store data items exported by exporting software components of the plurality of partitions and to provide the stored data items to reading software components of the plurality of partitions, wherein the at least one software component of each of the plurality of partitions communicates with the software components of different partitions exclusively via the communication hub and does not interface directly with any of the software components of different components, and wherein the at least one software component of each of the plurality of partitions does not know of the software components of different partitions, and
wherein the communication hub is configured to detect misconfigurations in the individual partition configurations when multiple exporting software components of the plurality of partitions are defined to export a same data item, wherein the communication hub is configured to grant, when a misconfiguration is detected, exporting rights to an exporting software component of the multiple exporting software components having highest criticality and, optionally, wherein the communication hub is configured to enforce grant of exporting rights using a memory management unit of the computing system.

2. The computing system of claim 1, wherein the communication hub comprises a central hub component storing the data items and local hub components in each of the plurality of partitions each providing an interface usable by the at least one software component of the respective partition to access the data items stored by the central hub component.

3. The computing system of claim 2, wherein each of the local hub components maintains a value history of the data items stored by the communication hub.

4. The computing system of claim 1, wherein each data item is exportable by exactly one exporting software component of the plurality of partitions.

5. The computing system of claim 4, wherein each data item stored by the communication hub is readable by any reading software component of the plurality of partitions or by reading software components of the plurality of partitions which have explicit reading rights for the respective data item.

6. The computing system of claim 1,
wherein the data items are stored in a tree structure, and
wherein the software components of the plurality of partitions use paths for traversing the tree structure to access the data items stored by the communication hub.

7. The computing system of claim 1,
wherein the communication hub is implemented using a shared memory,
wherein the data items stored by the communication hub are stored in the shared memory.

8. The computing system of claim 1, wherein each data item stored by the communication hub has at least one of a size attribute and an age attribute.

9. The computing system of claim 1, wherein, when the computing system is initialized, initialization of the communication hub is completed before the software components of the plurality of partitions are started.

10. The computing system of claim 1, wherein the communication hub is configured to fill, when the computing system is initialized, data items to be accessed with default values.

11. The computing system of claim 1, wherein the computing system comprises a monitoring component configured to export snapshots of the data items stored by the communication hub.

12. An aircraft comprising a computing system of claim 1.

13. An on-board computing system for an aircraft, the computing system comprising:
a plurality of partitions each including at least one software component configured to perform a function related to the aircraft,
wherein software components of different partitions of the plurality of partitions are configured to exchange data via a communication hub of the computing system, the communication hub being configured to store data items exported by exporting software components of the plurality of partitions and to provide the stored data items to reading software components of the plurality of partitions,
wherein the data items are stored in a tree structure,
wherein the software components of the plurality of partitions use paths for traversing the tree structure to access the data items stored by the communication hub, and
wherein the communication hub is configured to read, when the computing system is initialized, individual partition configurations from the plurality of partitions defining data items to be accessed by the at least one software component of the respective partition,
wherein the communication hub is configured to construct the tree structure based on the individual partition configurations.

14. The computing system of claim 13, wherein the communication hub is configured to detect misconfigurations in the individual partition configurations when multiple exporting software components of the plurality of partitions are defined to export a same data item.

15. The computing system of claim 14,
wherein the communication hub is configured to grant, when a misconfiguration is detected, exporting rights to an exporting software component of the multiple exporting software components having highest criticality and, optionally,
wherein the communication hub is configured to enforce grant of exporting rights using a memory management unit of the computing system.

16. An on-board computing system for an aircraft, the computing system comprising:
a plurality of partitions each including at least one software component configured to perform a function related to the aircraft,
wherein software components of different partitions of the plurality of partitions are configured to exchange data via a communication hub of the computing system, the communication hub being configured to store data items exported by exporting software components of the plurality of partitions and to provide the stored data items to reading software components of the plurality of partitions,
wherein the communication hub is implemented using a shared memory,
wherein the data items stored by the communication hub are stored in the shared memory, and
wherein the communication hub comprises a central hub component storing the data items and local hub components in each of the plurality of partitions each providing an interface usable by the at least one software component of the respective partition to access the data items stored by the central hub component,
wherein the data items are stored in a tree structure,
wherein the software components of the plurality of partitions use paths for traversing the tree structure to access the data items stored by the communication hub, and
wherein each of the local hub components maintains an index table mapping a path for traversing the tree structure to access the data items stored by the communication hub to a physical address of the shared memory.

* * * * *